United States Patent
Chen et al.

(10) Patent No.: US 12,401,486 B2
(45) Date of Patent: Aug. 26, 2025

(54) INFORMATION TRANSMISSION METHOD AND ELECTRONIC DEVICE

(71) Applicant: VIVO MOBILE COMMUNICATION CO., LTD., Guangdong (CN)

(72) Inventors: Xiaohang Chen, Guangdong (CN); Zhi Lu, Guangdong (CN); Xueming Pan, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 475 days.

(21) Appl. No.: 17/588,687

(22) Filed: Jan. 31, 2022

(65) Prior Publication Data
US 2022/0158807 A1    May 19, 2022

Related U.S. Application Data (63) Continuation of application No. PCT/CN2020/107746, filed on Aug. 7, 2020.

(30) Foreign Application Priority Data

Aug. 8, 2019  (CN) .......................... 201910731385.1

(51) Int. Cl.
*H04L 5/00* (2006.01)
*H04W 72/1268* (2023.01)

(52) U.S. Cl.
CPC .......... *H04L 5/0073* (2013.01); *H04L 5/0053* (2013.01); *H04L 5/0066* (2013.01); *H04W 72/1268* (2013.01)

(58) Field of Classification Search
CPC ... H04L 5/0073; H04L 5/0053; H04L 5/0066; H04L 5/0064; H04W 72/1268;
(Continued)

(56) References Cited

U.S. PATENT DOCUMENTS 12,022,482 B2 * 6/2024 Islam .................... H04W 72/23
2020/0137736 A1 4/2020 Du et al.
(Continued)

FOREIGN PATENT DOCUMENTS

CN     108712780 A     10/2018
CN     109218000 A     1/2019
(Continued)

OTHER PUBLICATIONS

VIVO, "Summary#2 of UL inter UE Tx prioritization/multiplexing", 3GPP TSG RAN WG1 Meeting #97, R1-1907819, Reno, USA, May 13-17, 2019.
(Continued)

*Primary Examiner* — John D Blanton
(74) *Attorney, Agent, or Firm* — Price Heneveld LLP (57) ABSTRACT

This disclosure provides an information transmission method and an electronic device. The method includes: transmitting an uplink cancellation indication, where the uplink cancellation indication includes first indication information and second indication information, a first parameter of the second indication information is determined based on a payload size of the uplink cancellation indication and a bit quantity of the first indication information, and the first parameter includes at least one of a bit quantity and an indication granularity.

20 Claims, 3 Drawing Sheets

(58) Field of Classification Search
CPC . H04W 72/23; H04W 28/06; H04W 72/0446; H04W 72/0453
See application file for complete search history.

(56) References Cited

U.S. PATENT DOCUMENTS

| | | | |
|---|---|---|---|
| 2020/0213984 A1 | 7/2020 | Hwang et al. | |
| 2020/0214008 A1* | 7/2020 | Jo | H04L 5/1469 |
| 2021/0152312 A1* | 5/2021 | Xiong | H04L 5/0064 |
| 2021/0168783 A1* | 6/2021 | Islam | H04L 5/0053 |
| 2021/0345366 A1* | 11/2021 | Ying | H04W 72/1263 |
| 2022/0158807 A1* | 5/2022 | Chen | H04L 5/0053 |
| 2022/0159683 A1* | 5/2022 | Islam | H04W 72/1268 |
| 2022/0159701 A1* | 5/2022 | Islam | H04L 1/1812 |
| 2022/0272739 A1* | 8/2022 | Takahashi | H04W 72/1268 |
| 2022/0353711 A1* | 11/2022 | Ying | H04W 72/1263 |

FOREIGN PATENT DOCUMENTS

| | | |
|---|---|---|
| CN | 109963335 A | 7/2019 |
| WO | 2018143689 A1 | 8/2018 |
| WO | 2019032844 A1 | 2/2019 |

OTHER PUBLICATIONS

Fujitsu, "Discussion on UL cancellation indication", 3GPP TSG RAN WG1 #97, R1-1906585, Reno, USA, May 13-17, 2019.
VIVO, "UL inter-UE Tx prioritization for URLLC", 3GPP TSG RAN WG1 #97, R1-1906150, Reno, USA, May 13-17, 2019.
Interdigital Inc., "On Enhanced inter UE Tx prioritization/multiplexing for eURLLC", 3GPP TSG RAN WG1 #97, R1-1907108, Reno, USA, Apr. 13-17, 2019.
Samsung, "UL inter-UE multiplexing/prioritization", 3GPP TSG RAN WG1 #97, R1-1906959, Reno, USA, May 13-17, 2019.
KT Corp., "Remaining details on preemption indication", 3GPP TSG RAN WG1 Meeting 90bis, R1-1718731, Prague, CZ, Oct. 9-13, 2017.
LG Electronics, "Remaining issues on pre-emption indication for downlink", 3GPP TSG RAN WG1 Meeting 90bis, R1-1717970, Prague, CZ, Oct. 9-13, 2017.
ZTE, "On pre-emption indication", 3GPP TSG RAN WG1 Meeting 90bis, R1-1717043, Prague, CZ, Oct. 9-13, 2017.
VIVO, "Summary of UL inter UE Tx prioritization/multiplexing", 3GPP TSG RAN WG1 Meeting #97, R1-1907666, Reno, USA, May 13-17, 2019.

* cited by examiner

Transmit an uplink cancellation indication, where the uplink cancellation indication includes first indication information and second indication information, a first parameter of the second indication information is determined based on a payload size of the uplink cancellation indication and a bit quantity of the first indication information, and the first parameter includes at least one of a bit quantity and an indication granularity — 301

INFORMATION TRANSMISSION METHOD AND ELECTRONIC DEVICE

CROSS-REFERENCE TO RELATED APPLICATIONS

This application is a continuation application of International Application No. PCT/CN2020/107746 filed on Aug. 7, 2020, which claims priority to Chinese Patent Application No. 201910731385.1, filed in China on Aug. 8, 2019, which are incorporated herein by reference in their entireties.

TECHNICAL FIELD

This disclosure relates to the field of communications technologies, and in particular, to an information transmission method and an electronic device.

BACKGROUND

With the development of communications technologies, future mobile communication systems, such as fifth generation (5G) mobile communication systems, need to adapt to more diverse scenarios and service requirements. Main scenarios in new radio (NR) include enhanced mobile broadband (eMBB), massive machine type communications (mMTC) (also referred to as massive internet of things), ultra-reliable and low-latency communications (URLLC), and the like. These scenarios impose requirements of high reliability, low latency, large bandwidth, and wide coverage for the system.

Generally, different services have different quality of service (QoS) requirements. For example, URLLC supports low-latency and high-reliability services. To achieve higher reliability, data needs to be transmitted at a lower bit rate, and channel state information (CSI) needs to be fed back faster and more accurately. The eMBB service meets a high throughput requirement, but is less sensitive to latency and reliability than the URLLC service. In addition, some user equipments (UE) may support services of different numerologies, that is, the UEs not only support low-latency and high-reliability URLLC services, but also support large-capacity and high-rate eMBB services.

The eMBB and URLLC services can be multiplexed by using two methods. One is semi-persistent resource allocation, in which eMBB service transmission and URLLC service transmission use different resource pools. This is equivalent that some time-frequency resources are reserved for URLLC services. Due to the dispersion and uncertainty of URLLC services, such resource reservation will reduce resource utilization. The other method is dynamic multiplexing, in which eMBB service transmission and URLLC service transmission share one resource pool, and a network side dynamically schedules eMBB transmission and URLLC transmission with multiplexing. Due to the latency requirement of URLLC transmission, the network side may schedule URLLC transmission to a resource that has been allocated to eMBB transmission. In dynamic multiplexing of eMBB transmission and URLLC transmission, because reliability of URLLC transmission needs to be guaranteed, the network side may send signaling to eMBB UE for suspending or canceling the eMBB service transmission, so as to reduce the impact and interference of the eMBB transmission on the URLLC transmission.

Parameters in indication information of an uplink cancellation indication are typically fixed parameters. Such fixed parameter configurations of the indication information are inflexible, and are likely to cause the waste of information bits or incomplete indication of the indication information.

SUMMARY

Embodiments of this disclosure provide an information transmission method and an electronic device.

According to a first aspect, some embodiments of this disclosure provide an information transmission method. The method includes:
  transmitting an uplink cancellation indication, where
    the uplink cancellation indication includes first indication information and second indication information, a first parameter of the second indication information is determined based on a payload size of the uplink cancellation indication and a bit quantity of the first indication information, and the first parameter includes at least one of a bit quantity and an indication granularity.

According to a second aspect, some embodiments of this disclosure further provide an electronic device. The electronic device includes:
  a transmission module, configured to transmit an uplink cancellation indication, where
    the uplink cancellation indication includes first indication information and second indication information, a first parameter of the second indication information is determined based on a payload size of the uplink cancellation indication and a bit quantity of the first indication information, and the first parameter includes at least one of a bit quantity and an indication granularity.

According to a third aspect, some embodiment of this disclosure further provide an electronic device, including a processor, a memory, and a computer program stored in the memory and capable of running on the processor. When the computer program is executed by the processor, the steps of the foregoing information transmission method are implemented.

According to a fourth aspect, some embodiments of this disclosure further provide a computer-readable storage medium, where a computer program is stored in the computer-readable storage medium. When the computer program is executed by a processor, the steps of the foregoing information transmission method are implemented.

BRIEF DESCRIPTION OF DRAWINGS

To describe the technical solutions in the embodiments of this disclosure more clearly, the following briefly describes the accompanying drawings required for describing some embodiments of this disclosure. Apparently, the accompanying drawings in the following description show merely some embodiments of this disclosure, and a person of ordinary skill in the art may still derive other drawings from these accompanying drawings without creative efforts.

DETAILED DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

The terms "first", "second", and the like in this specification and claims of this application are used to distinguish between similar objects instead of describing a specific order or sequence. It should be understood that the data termed in such a manner are interchangeable in proper cases so that the embodiments of this application can be implemented in other orders than the order illustrated or described in this application. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device. In addition, "and/or" used in this specification and claims indicates at least one of the connected objects. For example, "A and/or B and/or C" represents the following seven cases: only A; only B; only C; both A and B; both B and C; both A and C; and all A, B, and C.

For ease of understanding, the following describes some content related to some embodiments of this disclosure.

Downlink Control Information (DCI):

The DCI is downlink control information carried by a physical downlink control channel (PDCCH) and delivered by a network side to UE, to indicate uplink-downlink configuration, hybrid automatic repeat request (HARQ) information, power control, and the like to the UE.

Figure 1:
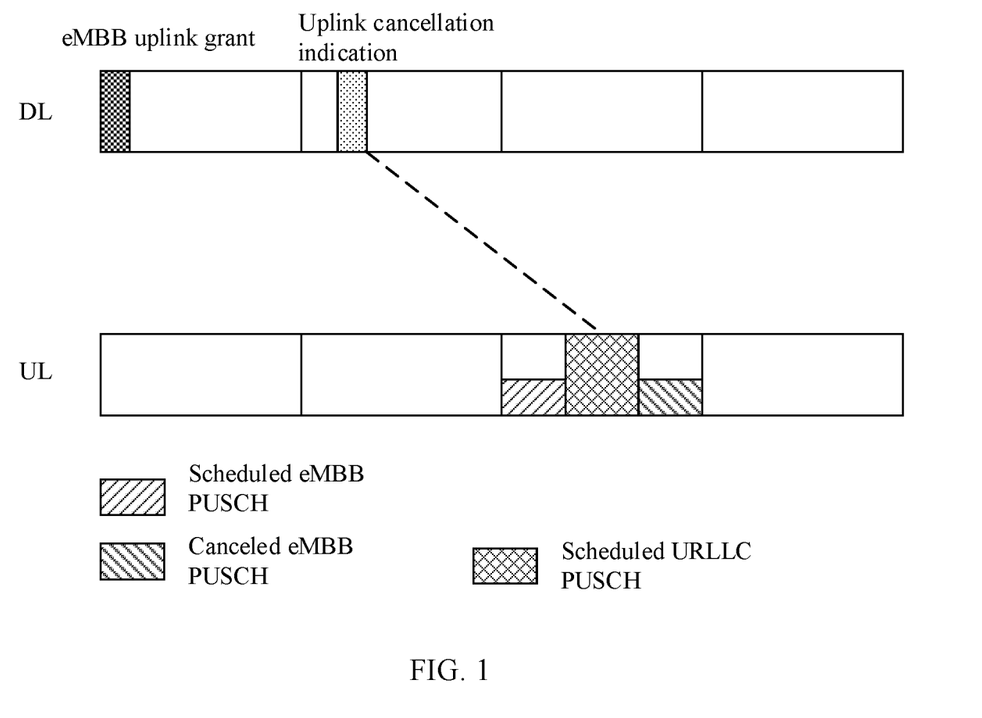
FIG. 1 is a schematic diagram of service scheduling in the prior art.

Uplink Cancellation Indication (ULCI):

In a case that eMBB UE is scheduled for uplink transmission of the eMBB service, if a network side needs to schedule another UE to transmit a URLLC service on an uplink resource that has been scheduled to the eMBB UE, it may send an uplink cancellation indication to the scheduled eMBB UE to cancel the eMBB service transmission, as shown in FIG. 1.

The uplink cancellation indication may include time domain indication information and frequency domain indication information. The time domain indication information may be used to indicate a time domain resource, and the frequency domain indication information may be used to indicate a frequency domain resource.

Figure 2:
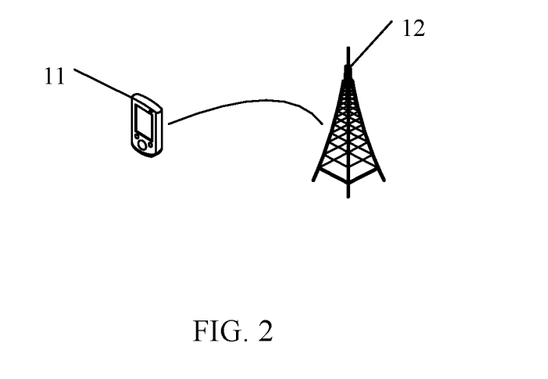
FIG. 2 is a structural diagram of a network system to which some embodiments of this disclosure may be applied.

Some embodiments of this disclosure provide an information transmission method. FIG. 2 is a structural diagram of a network system to which some embodiments of this disclosure may be applied. As shown in FIG. 2, the network system includes a terminal device 11 and a network-side device 12. The terminal device 11 may be a user-side device such as a mobile phone, a tablet computer, a laptop computer, a personal digital assistant (PDA), a mobile Internet device (MID), or a wearable device. It should be noted that a specific type of the terminal device 11 is not limited in some embodiments of this disclosure. The network-side device 12 may be a base station, for example, a macro base station, an LTE eNB, a 5G NR NB, or a gNB. The network-side device 12 may alternatively be a small cell, for example, a low power node (LPN), a pico cell, or a femto cell, or the network-side device 12 may be an access point (AP). The base station may alternatively be a network node formed by a central unit (CU) and a plurality of TRPs managed and controlled by the central unit. It should be noted that a specific type of the network-side device 12 is not limited in some embodiments of this disclosure.

It should be noted that the information transmission method provided in some embodiments of this disclosure may be executed by the network-side device 12, or may be executed by the terminal device 11.

Specifically, the network-side device 12 may send an uplink cancellation indication to the terminal device 11, where the uplink cancellation indication may include first indication information and second indication information, a first parameter of the second indication information may be determined based on a payload size of the uplink cancellation indication and a bit quantity of the first indication information, and the first parameter includes at least one of a bit quantity and an indication granularity.

The terminal device 12 may receive an uplink cancellation indication from the network-side device 11, where the uplink cancellation indication may include first indication information and second indication information, a first parameter of the second indication information may be determined based on a payload size of the uplink cancellation indication and a bit quantity of the first indication information, and the first parameter includes at least one of a bit quantity and an indication granularity.

Figure 3:
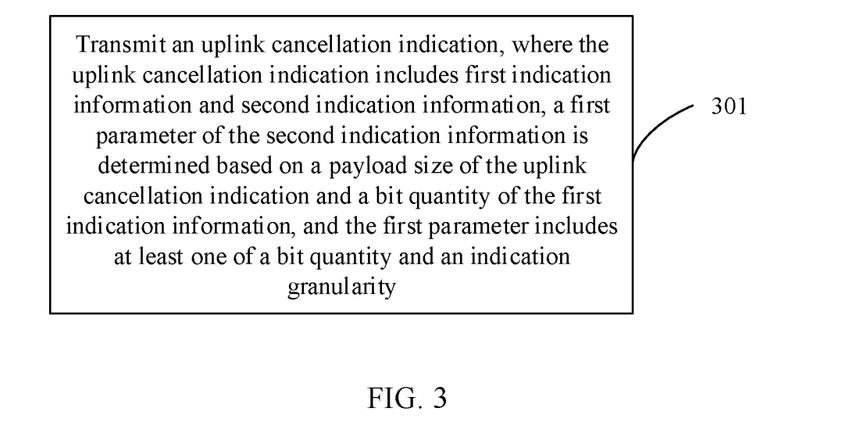
FIG. 3 is a flowchart of an information transmission method according to some embodiments of this disclosure.

Some embodiments of this disclosure provide an information transmission method, applied to an electronic device. The electronic device may be a network-side device or a terminal device. FIG. 3 is a flowchart of an information transmission method according to some embodiments of this disclosure. As shown in FIG. 3, the method includes the following step.

Step 301. Transmit an uplink cancellation indication, where the uplink cancellation indication includes first indication information and second indication information, a first parameter of the second indication information is determined based on a payload size of the uplink cancellation indication and a bit quantity of the first indication information, and the first parameter includes at least one of a bit quantity and an indication granularity.

In this embodiment, the transmitting an uplink cancellation indication may include sending the uplink cancellation indication or receiving the uplink cancellation indication. For example, if the electronic device is a network-side device, the transmitting an uplink cancellation indication may be understood as sending the uplink cancellation indication; if the electronic device is a terminal device, the transmitting an uplink cancellation indication may be understood as receiving the uplink cancellation indication.

Optionally, one of the first indication information and the second indication information may be time domain indication information, and the other may be frequency domain indication information. For example, the first indication information is time domain indication information, and the second indication information is frequency domain indication information; or the first indication information is frequency domain indication information, and the second indication information is time domain indication information. The time domain indication information may be used to indicate a time domain resource, and the frequency domain indication information may be used to indicate a frequency domain resource.

The first parameter may include, but is not limited to, at least one of the bit quantity and the indication granularity. For example, the first parameter may further include an indication format, and the like. The indication granularity, also known as granularity, may be used to reflect a fineness of an indicated resource. For example, for an indication format of bitmap, if the indication granularity is 1 symbol, each bit of the time domain indication information indicates 1 symbol; if the indication granularity is 2 symbols, each bit of the time domain indication information indicates 2 symbols.

The payload size of the uplink cancellation indication may be predefined by a protocol or configured by the network side, which is not limited in this embodiment.

In this embodiment, the bit quantity of the first indication information may be determined first. The bit quantity of the first indication information may be a bit quantity actually required by the first indication information. For example, the bit quantity actually used by the first indication information may be determined based on a resource area size indicated by the first indication information (that is, an indicated resource area size of the first indication information) or based on configuration information, or the like. Therefore, one or more of the bit quantity, indication granularity, and the like of the second indication information may be determined based on the bit quantity of the first indication information and the payload size of the uplink cancellation indication.

For example, a difference between the payload size of the uplink cancellation indication and the bit quantity of the first indication information may be used as the bit quantity of the second indication information, and the indication granularity of the second indication information may be determined based on the bit quantity of the second indication information and a resource area size indicated by the second indication information or second configuration information; or a bit quantity actually required by the second indication information may be determined based on a resource area sized indicated by the second indication information or based on configuration information, and the bit quantity of the second indication information may be determined based on the payload size of the uplink cancellation indication, the bit quantity of the first indication information, and the bit quantity actually required by the second indication information. For example, the difference between the payload size of the uplink cancellation indication and the bit quantity of the first indication information may be compared with the bit quantity actually required by the second indication information, and the bit quantity of the second indication information is determined based on a comparison result.

According to the information transmission method in some embodiments of this disclosure, at least one of the bit quantity and indication granularity of the second indication information is determined based on the payload size of the uplink cancellation indication and the bit quantity of the first indication information. This can improve the flexibility of parameter configuration of the indication information, thereby reducing the waste of information bits or the occurrence of incomplete indication of the indication information.

Optionally, the bit quantity of the first indication information may be determined based on first resource information.

The first resource information may include at least one of an indicated resource area size of the first indication information and first configuration information.

In this embodiment, if the first indication information is time domain indication information, the indicated resource area size may be a time domain resource area size required to be indicated; if the first indication information is frequency domain indication information, the indicated resource area size may be a frequency domain resource area size required to be indicated.

In an embodiment, the bit quantity of the first indication information may be determined based on the indicated resource area size of the first indication information. For example, if the indicated resource area size of the first indication information is K time units, and an indication format of bitmap is used, the bit quantity of the first indication information may be K.

In another embodiment, the bit quantity of the first indication information may be determined based on the first configuration information, where the first configuration information may be configuration information predefined by a protocol, or configuration information configured by the network side. For example, if the first configuration information may include multiple preset bit quantities for the first indication information, one of the multiple preset bit quantities may be determined as the bit quantity of the first indication information. For example, a preset bit quantity indicated by the network side is used as the bit quantity of the first indication information.

In another embodiment, the bit quantity of the first indication information may be jointly determined based on the indicated resource area size of the first indication information and the first configuration information. For example, if the first configuration information may include multiple preset bit quantities for the first indication information, the bit quantity actually required by the first indication information may be determined based on the indicated resource area size of the first indication information, and one of the multiple preset bit quantities may be determined as the bit quantity of the first indication information based on the bit quantity actually required by the first indication information. For example, a preset bit quantity that is greater than and closest to the bit quantity actually required by the first indication information in the multiple preset bit quantities is used as the bit quantity of the first indication information.

Optionally, the bit quantity of the first indication information may be determined based on the first resource information and a second parameter, where the second parameter includes at least one of the following: a first bit quantity, a first indication format, and a first indication granularity; and the first bit quantity is a preset bit quantity of the first indication information, the first indication format is a preset format of the first indication information, and the first indication granularity is a preset indication granularity of the first indication information.

In this embodiment, the first bit quantity, the first indication format, and the first indication granularity may all be predefined by a protocol or configured by the network side. The first indication format may include any one of indicating a resource in a format of bitmap, indicating a resource in a format of start position indication vector, indicating a resource in a format of start and length indication vector, and the like.

Some embodiments of this disclosure are described below with reference to examples.

For example, if the second parameter includes the first bit quantity, the bit quantity actually required by the first indication information, S, may be calculated based on the first resource information. In a case that S is less than or equal to the first bit quantity, the bit quantity of the first indication information may be S; in a case that S is greater than the first bit quantity, the bit quantity of the first indication information may be S, or may be a bit quantity calculated after the first indication information is compressed.

For another example, if the second parameter includes the first indication format and the first indication granularity, the bit quantity actually required by the first indication information, S, may be calculated based on the first indication format, the first indication granularity, and the first resource information, and S may be used as the bit quantity of the first indication information.

For another example, if the second parameter includes the first bit quantity, the first indication format, and the first indication granularity, the bit quantity actually required by the first indication information, S, may be calculated based on the first indication format, the first indication granularity, and the first resource information. In a case that S is less than or equal to the first bit quantity, the bit quantity of the first indication information may be S; in a case that S is greater than the first bit quantity, the bit quantity of the first indication information may be S, or may be a bit quantity calculated after the first indication information is compressed.

In some embodiments of this disclosure, the bit quantity of the first indication information is determined based on the first resource information and the second parameter, thereby improving calculation correctness of the bit quantity of the first indication information.

Optionally, the first indication information in the first indication format may include one of the following:
 a start position indication vector;
 a start and length indication vector; and
 a bitmap.

In this embodiment, different states of the start position indication vector may be used to indicate different resource start positions. For example, if the start position indication vector includes 3 bits, the start position indication vector may include 8 states: 000, 001, 010, 011, 100, 101, 110, and 111, and each of the states may be used to indicate one resource start position. Different states of the start and length indication vector (SLIV) may be used to indicate different combinations of resource start position and resource length. Different bits in the bitmap may be used to indicate different resources. For example, each bit of the bitmap may be used to indicate at least one resource element or resource element group.

Optionally, in a case that the indicated resource area includes K resource elements and the indication granularity is L resource elements, if the first indication information in the first indication format is a start position indication vector, the bit quantity of the first indication information may be $M=\lceil \log 2(K/L) \rceil$, that is, M is equal to rounding up to log 2(K/L).

Optionally, in a case that the indicated resource area includes K resource elements and the indication granularity is L resource elements, if the first indication information in the first indication format is a start and length indication vector, the bit quantity of the first indication information may be $M=\lceil \log 2(K*(K+L)/(2*L)) \rceil$, that is, M is equal to rounding up to log 2(K*(K+L)/(2*L)).

Optionally, in a case that the indicated resource area includes K resource elements and the indication granularity is L resource elements, if the first indication information in the first indication format is a bitmap, the bit quantity of the first indication information may be $M=\lceil K/L \rceil$, that is, M is equal to rounding up to K/L.

It should be noted that L may be any positive integer.

Optionally, in a case that a first information compression condition is met, the bit quantity of the first indication information is a second bit quantity determined based on the first resource information and a second indication granularity, where
 the second indication granularity is greater than the first indication granularity.

In this embodiment, the second indication granularity may be any indication granularity greater than the first indication granularity.

Optionally, in a case that no compression is required for the first indication information, that is, in a case that the first information compression condition is not met, a bit quantity determined based on the first resource information and the first indication granularity may be used as the bit quantity of the first indication information. In a case that compression is required for the first indication information, that is, in a case that the first information compression condition is met, the bit quantity determined based on the first resource information and the second indication granularity may be used as the bit quantity of the first indication information.

In practical applications, in a case that compression is required for the first indication information, for example, in a case that the bit quantity determined based on the first resource information and the first indication granularity is greater than the first bit quantity, or that the network side requires that the first indication information be compressed, resource elements in the indicated resource area may be combined, meaning that a coarser or larger indication granularity is used, to reduce the required bit quantity. For example, a time domain resource area contains T time units, two time units may be combined to obtain T/2 time unit groups, and a bit quantity of time domain indication information may be determined based on a quantity of time unit groups contained in the time domain resource area.

In this embodiment, in a case that compression is required for the first indication information, a larger indication granularity is used to indicate a resource. This can not only reduce the bit quantity required by the first indication information, but also avoid the problem of incomplete indication of the resource area.

Optionally, the first information compression condition may include that a third bit quantity is greater than the first bit quantity, where the third bit quantity may be a bit quantity determined based on the first resource information and the first indication granularity.

In this embodiment, in a case that the bit quantity determined based on the first resource information and the first indication granularity is greater than the first bit quantity, the indication granularity may be increased, that is, the bit quantity of the first indication information is determined based on the first resource information and the second indication granularity, to reduce the bit quantity of the first indication information.

Optionally, the second bit quantity may be a bit quantity that is closest to the first bit quantity among bit quantities smaller than the first bit quantity, or the second bit quantity is equal to the first bit quantity.

In practical applications, in a case that the bit quantity determined based on the first resource information and the first indication granularity is greater than the first bit quantity, an appropriate second indication granularity may be determined such that the second bit quantity is a bit quantity (or data) that is closest to the first bit quantity among the bit quantities smaller than the first bit quantity, or the second bit quantity is equal to the first bit quantity.

For example, if a time domain resource area contains 8 time units, the first bit quantity is 3, the format of bitmap is used, and the first indication granularity is 1 time unit, it may be obtained that the third bit quantity is 6. Because the third bit quantity is greater than the first bit quantity, the indication granularity may be increased such that a second bit quantity calculated based on the increased indication granularity is smaller than and closest to the first bit quantity, or the second bit quantity is equal to the first bit quantity. Therefore, it may be obtained that in a case that the second indication granularity is 3 time units, the second bit quantity is smaller than the first bit quantity and closest to the first bit quantity.

Optionally, in a case that a second information compression condition is met, the bit quantity of the first indication information may be a fourth bit quantity determined based on the first resource information and a second indication format, where the fourth bit quantity is smaller than a fifth bit quantity, and the fifth bit quantity is a bit quantity determined based on the first resource information and the first indication format.

In this embodiment, a bit quantity of the first indication information in the second indication format is smaller than a bit quantity of the first indication information in the first indication format. For example, in a case that the first indication information in the second indication format is a start position indication vector, that the first indication information in the first indication format is a bitmap, that the indicated resource area includes K resource elements, and that the indication granularity is one resource element, the bit quantity of the start position indication vector is $\lceil \log 2(K) \rceil$, and the bit quantity of the bitmap is K. Therefore, the bit quantity of the start position indication vector is smaller than the bit quantity of the bitmap.

In practical applications, in a case that compression is required for the first indication information, that is, in a case that a second information compression condition is met, for example, in a case that the bit quantity determined based on the first resource information and the first indication format is greater than the first bit quantity, or that the network side requires that the first indication information be compressed, an indication format with a smaller bit quantity may be used. This can not only reduce the required bit quantity, but also avoid the problem of incomplete indication of the resource area.

Optionally, the second information compression condition includes that the fifth bit quantity is greater than the first bit quantity.

In this embodiment, in a case that the bit quantity determined based on the first resource information and the first indication format is greater than the first bit quantity, the bit quantity of the first indication information may be determined based on the first resource information and the second indication format.

Optionally, the first indication information is time domain indication information, and the indicated resource area size of the time domain indication information may be determined based on a monitoring periodicity of the uplink cancellation indication.

In this embodiment, in a case that the first indication information is time domain indication information, a time domain resource area size may be determined based on the monitoring periodicity of the uplink cancellation indication. For example, if the monitoring periodicity of the uplink cancellation indication is 7 symbols, the time domain resource area size is 7 symbols.

Optionally, the first indication information is frequency domain indication information, and an indicated resource area size of the frequency domain indication information may be determined based on a frequency domain resource area configured by the network side, or may be determined based on a currently activated uplink bandwidth part (BWP).

Optionally, the bit quantity of the second indication information may be a difference between the payload size of the uplink cancellation indication and the bit quantity of the first indication information.

For example, if the payload size of the uplink cancellation indication is 14 bits, and the bit quantity of the first indication information is 7 bits, the bit quantity of the second indication information is 14−7=7.

Optionally, the bit quantity of the second indication information may be determined based on the payload size of the uplink cancellation indication, the bit quantity of the first indication information, and a third parameter.

The third parameter includes at least one of the following: a preset bit quantity of the second indication information, a preset indication format of the second indication information, and a preset indication granularity of the second indication information.

For example, a bit quantity required by the second indication information may be determined based on the preset indication format of the second indication information, the preset indication granularity of the second indication information, and an indicated resource area size of the second indication information, and the bit quantity of the second indication information may be determined based on the determined bit quantity required by the second indication information, the payload size of the uplink cancellation indication, and the bit quantity of the first indication information.

For another example, the difference between the payload size of the uplink cancellation indication and the bit quantity of the first indication information may be compared with the preset bit quantity of the second indication information; and if the difference between the payload size of the uplink cancellation indication and the bit quantity of the first indication information is greater than the preset bit quantity of the second indication information, it may be determined that the bit quantity of the second indication information is the preset bit quantity of the second indication information; otherwise, it may be determined that the bit quantity of the second indication information is the difference between the payload size of the uplink cancellation indication and the bit quantity of the first indication information.

Optionally, the indication granularity of the second indication information may be determined based on the bit quantity of the second indication information and second resource information, where the second resource information includes at least one of an indicated resource area size of the second indication information and second configuration information.

For example, if the second indication information is frequency domain indication information, a bit quantity of the frequency domain indication information is 7 bits, and a frequency domain bandwidth corresponds to 50 physical resource blocks (PRB), it is determined, based on the bit quantity of the frequency domain indication information, that an indication granularity of the frequency domain indication information is $\lceil 50/7 \rceil = 8$ PRBs, that is, a maximum quantity of frequency domain resource units indicated by each bit of the frequency domain indication information is 8 PRBs.

It should be noted that the second configuration information may be resource configuration information predefined by a protocol, or may be resource configuration information configured by the network side.

In this embodiment, the indication granularity of the second indication information is determined based on the bit quantity of the second indication information and the second resource information. In this way, the indication granularity can be flexibly adjusted based on the indicated resource area size, thereby reducing the waste of information bits or the occurrence of incomplete indication of the indication information.

For ease of understanding, the information transmission method in some embodiments of this disclosure is described below with reference to examples.

Example 1

A bit quantity of a preset payload size of the uplink cancellation indication is 14 bits.

The determining a bit quantity of time domain indication information of the uplink cancellation indication may include:
  if the monitoring periodicity of the uplink cancellation indication is 7 symbols, obtaining that a size of a time domain area that can be indicated by the time domain indication information is 7 symbols; and if an indication format of bitmap is used, determining, based on the size of the time domain area, that a bit quantity of the time domain indication information is 7 bits, where each bit indicates 1 symbol in the time domain area.

The determining a bit quantity of frequency domain indication information of the uplink cancellation indication may include:
  determining, based on the preset payload size of the uplink cancellation indication and the actually determined bit quantity of the time domain indication information, that the bit quantity of the frequency domain indication information is 14−7=7 bits.

If a frequency domain bandwidth corresponds to 50 PRBs, it is determined, based on the bit quantity of the frequency domain indication information, that an indication granularity of the frequency domain indication information is ceil(50/7)=8 PRBs, meaning that a maximum quantity of frequency domain resource units indicated by each bit of the frequency domain indication information is 8 PRBs.

Example 2

A bit quantity of a preset payload size of the uplink cancellation indication is 14 bits.

The determining a bit quantity of time domain indication information of the uplink cancellation indication may include:
  if the monitoring periodicity of the uplink cancellation indication is 4 symbols, obtaining that a size of a time domain area that can be indicated by the time domain indication information is 4 symbols; and if an indication format of bitmap is used, determining, based on the size of the time domain area, that the bit quantity of the time domain indication information is 4 bits, where each bit indicates 1 symbol in the time domain area.

The determining a bit quantity of frequency domain indication information of the uplink cancellation indication may include:
  determining, based on the preset payload size of the uplink cancellation indication and the actually determined bit quantity of the time domain indication information, that the bit quantity of the frequency domain indication information 14−4=10 bits.

If a frequency domain bandwidth corresponds to 50 PRBs, it is determined, based on the bit quantity of the frequency domain indication information, that an indication granularity of the frequency domain indication information is ceil(50/10)=5 PRBs, meaning that a maximum quantity of frequency domain resource units indicated by each bit of the frequency domain indication information is 5 PRBs.

Example 3

A bit quantity of a preset payload size of the uplink cancellation indication is 14 bits, and a preset bit quantity of time domain indication information of the uplink cancellation indication is 7.

The determining a bit quantity of time domain indication information of the uplink cancellation indication may include:
  if the monitoring periodicity of the uplink cancellation indication is 4 symbols, obtaining that a size of a time domain area that can be indicated by the time domain indication information is 4 symbols; and if an indication format of bitmap is used, determining, based on the size of the time domain area, that the actual bit quantity of the time domain indication information is 4 bits, where each bit indicates 1 symbol in the time domain area.

The determining a bit quantity of frequency domain indication information of the uplink cancellation indication may include:
  determining, based on the preset payload size of the uplink cancellation indication and the actually determined bit quantity of the time domain indication information, that the bit quantity of the frequency domain indication information is (14−7)+(7−4)=10 bits.

If a frequency domain bandwidth corresponds to 50 PRBs, it is determined, based on the bit quantity of the frequency domain indication information, that an indication granularity of the frequency domain indication information is ceil(50/10)=5 PRBs, meaning that a maximum quantity of frequency domain resource units indicated by each bit of the frequency domain indication information is 5 PRBs.

Example 4

A bit quantity of a preset payload size of the uplink cancellation indication is 14 bits, and a preset bit quantity of time domain indication information of the uplink cancellation indication is 4.

The determining a bit quantity of time domain indication information of the uplink cancellation indication may include:
  if the monitoring periodicity of the uplink cancellation indication is 7 symbols, obtaining that a size of a time domain area that can be indicated by the time domain indication information is 7 symbols; and if an indication format of bitmap is used, determining, based on the size of the time domain area, that the actual bit quantity of the time domain indication information is 7 bits.

Because the bit quantity of the time domain indication information determined based on the size of the time domain area is greater than 4, time domain resources contained in the time domain area may be combined. Two symbols may be combined, and then the time domain area will contain ceil(7/2)=4 symbol groups, where each group contains up to 2 symbols, and each bit indicates one symbol group in the time domain area.

The determining a bit quantity of frequency domain indication information of the uplink cancellation indication may include:
- determining, based on the preset payload size of the uplink cancellation indication and the actually determined bit quantity of the time domain indication information, that the bit quantity of the frequency domain indication information is 14−4=10 bits.

If a frequency domain bandwidth corresponds to 50 PRBs, it is determined, based on the bit quantity of the frequency domain indication information, that an indication granularity of the frequency domain indication information is ceil(50/10)=5 PRBs, meaning that a maximum quantity of frequency domain resource units indicated by each bit of the frequency domain indication information is 5 PRBs.

Example 5

A bit quantity of a preset payload size of the uplink cancellation indication is 14 bits.

The determining a bit quantity of time domain indication information of the uplink cancellation indication may include:
- if the monitoring periodicity of the uplink cancellation indication is 7 symbols, obtaining that a size of a time domain area that can be indicated by the time domain indication information is 7 symbols; and if an indication format of indicating a start position is used, determining, based on the size of the time domain area, that the bit quantity of the time domain indication information is ceil[log 2(7)]=3 bits, where each state indicates one start position S in the time domain area.

The determining a bit quantity of frequency domain indication information of the uplink cancellation indication may include:
- determining, based on the preset payload size of the uplink cancellation indication and the actually determined bit quantity of the time domain indication information, that the bit quantity of the frequency domain indication information is 14−3=11 bits.

If a frequency domain bandwidth corresponds to 50 PRBs, it is determined, based on the bit quantity of the frequency domain indication information, that an indication granularity of the frequency domain indication information is ceil(50/11)=5 PRBs, meaning that a maximum quantity of frequency domain resource units indicated by each bit of the frequency domain indication information is 5 PRBs.

Example 6

A bit quantity of a preset payload size of the uplink cancellation indication is 14 bits.

The determining a bit quantity of time domain indication information, M, of the uplink cancellation indication may include:
- if the monitoring periodicity of the uplink cancellation indication is 7 symbols, obtaining that a size of a time domain area that can be indicated by the time domain indication information is 7 symbols; and if an indication format of SLIV is used, determining, based on the size of the time domain area, that the bit quantity of the time domain indication information is M=ceil[log 2(7*(7+1)/]=4 bits, where each state indicates one combination of start position and length in the time domain area.

The determining a bit quantity of frequency domain indication information of the uplink cancellation indication may include:
- determining, based on the preset payload size of the uplink cancellation indication and the actually determined bit quantity of the time domain indication information, that the bit quantity of the frequency domain indication information is 14−4=10 bits.

If a frequency domain bandwidth corresponds to 50 PRBs, it may be determined, based on the bit quantity of the frequency domain indication information, that an indication granularity of the frequency domain indication information is ceil(50/10)=5 PRBs, meaning that a maximum quantity of frequency domain resource units indicated by each bit of the frequency domain indication information is 5 PRBs.

Example 7

A bit quantity of a preset payload size of the uplink cancellation indication is 14 bits.

The determining a bit quantity of frequency domain indication information, M, of the uplink cancellation indication may include:
- if a frequency domain bandwidth corresponds to 50 PRBs, a frequency domain indication granularity configured by RRC is 4 PRBs, and an indication format of SLIV is used, determining, based on the frequency domain indication granularity, that the bit quantity actually used by the frequency domain indication information is M=ceil[log 2((50/4)*(50/4+1)/2)]=7 bits.

The determining the bit quantity actually used by time domain indication information of the uplink cancellation indication may include:
- determining, based on the preset payload size of the uplink cancellation indication and the actually determined bit quantity of the frequency domain indication information, that the bit quantity of the time domain indication information is 14−7=7 bits.
- if the monitoring periodicity of the uplink cancellation indication is 7 symbols, obtaining that a size of a time domain area that can be indicated by the time domain indication information is 7 symbols; and if an indication format of bitmap is used, determining, based on the size of the time domain area and the bit quantity of the time domain indication information, that an indication granularity of the time domain indication information is 1 symbol.

Example 8

A bit quantity of a preset payload size of the uplink cancellation indication is 14 bits.

The determining a bit quantity of frequency domain indication information, M, of the uplink cancellation indication may include:
- if a frequency domain bandwidth corresponds to 100 PRBs, a frequency domain indication granularity configured by RRC is 4 PRBs, and an indication format of SLIV is used, determining, based on the indication granularity of the frequency domain indication information, that the bit quantity actually used by the frequency domain indication information is M=ceil[log 2((100/4)*(100/4+1)/2)]=9 bits.

The determining the bit quantity actually used by time domain indication information of the uplink cancellation indication may include:

determining, based on the preset payload size of the uplink cancellation indication and the actually determined bit quantity of the frequency domain indication information, that the bit quantity of the time domain indication information is 14−9=5 bits.

If the monitoring periodicity of the uplink cancellation indication is 7 symbols, it may be obtained that a size of a time domain area that can be indicated by the time domain indication information is 7 symbols; and if an indication format of bitmap is used, it may be determined, based on the size of the time domain area and the bit quantity of the time domain indication information, that an indication granularity of the time domain indication information is ceil(7/5)=2 symbols; if an indication format of SLIV is used, each state may indicate any one start position and length.

In summary, the information transmission method provided in some embodiments of this disclosure may be applied to a case in which the indicated resource area size of the uplink cancellation indication changes, to avoid the waste of information bits (for example, a bit quantity of indication information is greater than an indicated resource area size) or incomplete indication information (for example, a bit quantity of indication information is less than an indicated area size).

Figure 4:
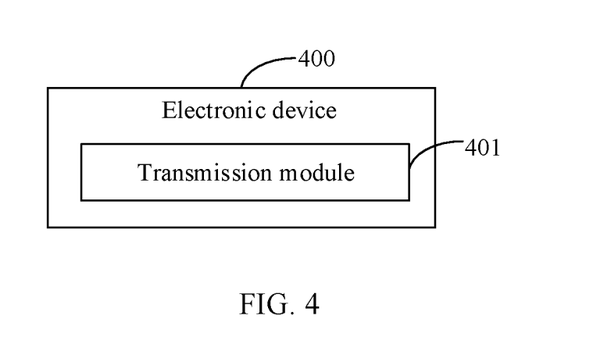
FIG. 4 is a structural diagram of an electronic device according to some embodiments of this disclosure.

FIG. 4 is a structural diagram of an electronic device according to some embodiments of this disclosure. As shown in FIG. 4, the electronic device 400 includes:
  a transmission module 401, configured to transmit an uplink cancellation indication, where
  the uplink cancellation indication includes first indication information and second indication information, a first parameter of the second indication information is determined based on a payload size of the uplink cancellation indication and a bit quantity of the first indication information, and the first parameter includes at least one of a bit quantity and an indication granularity.

Optionally, the bit quantity of the first indication information is determined based on first resource information, where
  the first resource information includes at least one of an indicated resource area size of the first indication information and first configuration information.

Optionally, the bit quantity of the first indication information is determined based on the first resource information and a second parameter, where
  the second parameter includes at least one of the following: a first bit quantity, a first indication format, and a first indication granularity; and the first bit quantity is a preset bit quantity of the first indication information, the first indication format is a preset format of the first indication information, and the first indication granularity is a preset indication granularity of the first indication information.

Optionally, the first indication information in the first indication format includes one of the following:
  a start position indication vector;
  a start and length indication vector; and
  a bitmap.

Optionally, in a case that a first information compression condition is met, the bit quantity of the first indication information is a second bit quantity determined based on the first resource information and a second indication granularity, where
  the second indication granularity is greater than the first indication granularity.

Optionally, the first information compression condition includes that a third bit quantity is greater than the first bit quantity, where the third bit quantity is a bit quantity determined based on the first resource information and the first indication granularity.

Optionally, in a case that a second information compression condition is met, the bit quantity of the first indication information is a fourth bit quantity determined based on the first resource information and a second indication format, where
  the fourth bit quantity is smaller than a fifth bit quantity, and the fifth bit quantity is a bit quantity determined based on the first resource information and the first indication format.

Optionally, the second information compression condition includes that the fifth bit quantity is greater than the first bit quantity.

Optionally, the first indication information is time domain indication information, and the indicated resource area size of the time domain indication information is determined based on a monitoring periodicity of the uplink cancellation indication.

Optionally, the bit quantity of the second indication information is a difference between the payload size of the uplink cancellation indication and the bit quantity of the first indication information.

Optionally, the indication granularity of the second indication information is determined based on the bit quantity of the second indication information and second resource information, where
  the second resource information includes at least one of an indicated resource area size of the second indication information and second configuration information.

Optionally, one of the first indication information and the second indication information is time domain indication information, and the other is frequency domain indication information.

The electronic device 400 provided in some embodiments of this disclosure is capable of implementing processes that are implemented by the electronic device in the foregoing method embodiment. To avoid repetition, details are not described herein again.

In the electronic device 400 in some embodiments of this disclosure, the transmission module 401 is configured to transmit an uplink cancellation indication, where the uplink cancellation indication includes first indication information and second indication information, a first parameter of the second indication information is determined based on a payload size of the uplink cancellation indication and a bit quantity of the first indication information, and the first parameter includes at least one of a bit quantity and an indication granularity. This can improve the flexibility of parameter configuration of the indication information, thereby reducing the waste of information bits or the occurrence of incomplete indication of the indication information.

Figure 5:
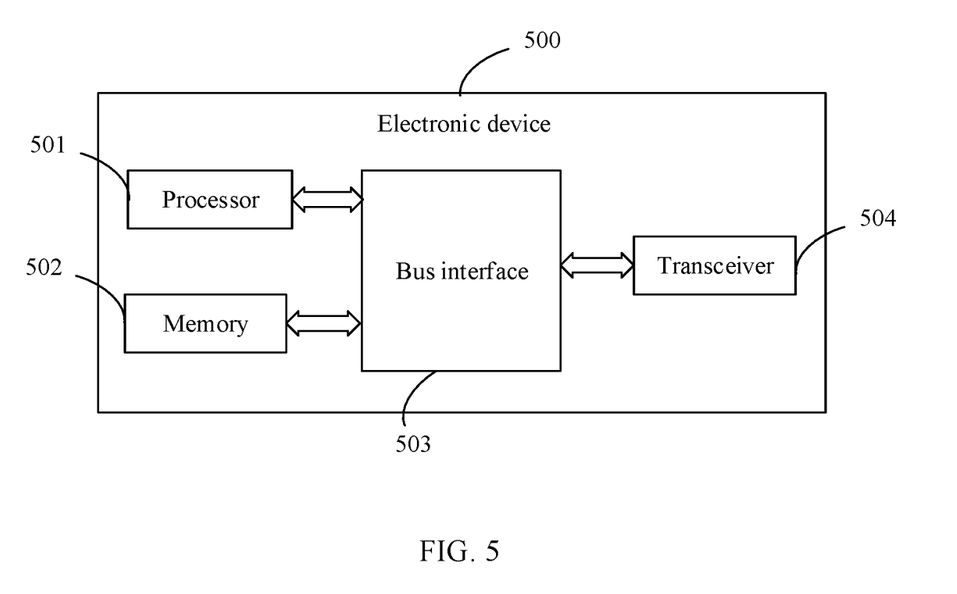
FIG. 5 is a structural diagram of an electronic device according to some embodiments of this disclosure.

FIG. 5 is a structural diagram of an electronic device according to some embodiments of this disclosure. As shown in FIG. 5, the electronic device 500 includes: a processor 501, a memory 502, a bus interface 503, and a transceiver 504, where the processor 501, the memory 502, and the transceiver 504 are all connected to the bus interface 503.

In some embodiments of this disclosure, the electronic device 500 further includes a computer program stored in the memory 502 and capable of running on the processor 501. When the computer program is executed by the processor 501, the following step is implemented:
  transmitting an uplink cancellation indication, where the uplink cancellation indication includes first indication information and second indication information, a first parameter of the second indication information is determined based on a payload size of the uplink cancellation indication and a bit quantity of the first indication information, and the first parameter includes at least one of a bit quantity and an indication granularity.

Optionally, the bit quantity of the first indication information is determined based on first resource information, where the first resource information includes at least one of an indicated resource area size of the first indication information and first configuration information.

Optionally, the bit quantity of the first indication information is determined based on the first resource information and a second parameter, where the second parameter includes at least one of the following: a first bit quantity, a first indication format, and a first indication granularity; and the first bit quantity is a preset bit quantity of the first indication information, the first indication format is a preset format of the first indication information, and the first indication granularity is a preset indication granularity of the first indication information.

Optionally, the first indication information in the first indication format includes one of the following:

a start position indication vector;

a start and length indication vector; and a bitmap.

Optionally, in a case that a first information compression condition is met, the bit quantity of the first indication information is a second bit quantity determined based on the first resource information and a second indication granularity, where the second indication granularity is greater than the first indication granularity.

Optionally, the first information compression condition includes that a third bit quantity is greater than the first bit quantity, where the third bit quantity is a bit quantity determined based on the first resource information and the first indication granularity.

Optionally, in a case that a second information compression condition is met, the bit quantity of the first indication information is a fourth bit quantity determined based on the first resource information and a second indication format, where the fourth bit quantity is smaller than a fifth bit quantity, and the fifth bit quantity is a bit quantity determined based on the first resource information and the first indication format.

Optionally, the second information compression condition includes that the fifth bit quantity is greater than the first bit quantity.

Optionally, the first indication information is time domain indication information, and the indicated resource area size of the time domain indication information is determined based on a monitoring periodicity of the uplink cancellation indication.

Optionally, the bit quantity of the second indication information is a difference between the payload size of the uplink cancellation indication and the bit quantity of the first indication information.

Optionally, the indication granularity of the second indication information is determined based on the bit quantity of the second indication information and second resource information, where the second resource information includes at least one of an indicated resource area size of the second indication information and second configuration information.

Optionally, one of the first indication information and the second indication information is time domain indication information, and the other is frequency domain indication information.

Some embodiments of this disclosure further provide an electronic device, including a processor 501, a memory 502, and a computer program stored in the memory 502 and capable of running on the processor 501. When the computer program is executed by the processor 501, the processes of the foregoing information transmission method embodiments are implemented, and a same technical effect can be achieved. To avoid repetition, details are not described herein again.

Some embodiments of this disclosure further provide a computer-readable storage medium, where the computer-readable storage medium stores a computer program. When the computer program is executed by a processor, the processes of the foregoing information transmission method embodiments are implemented, and a same technical effect can be achieved. To avoid repetition, details are not described herein again. For example, the computer-readable storage medium is a read-only memory (ROM), a random access memory (RAM), a magnetic disk, an optical disc, or the like.

It can be understood that some embodiments of this disclosure may be implemented by hardware, software, firmware, middleware, microcode, or a combination thereof. For hardware implementation, the module, unit, submodule, subunit, and the like may be implemented in one or more application-specific integrated circuits (ASIC), digital signal processors (DSP), digital signal processing devices (DSPD), programmable logic devices (PLD), field-programmable gate arrays (FPGA), general-purpose processors, controllers, microcontrollers, microprocessors, and other electronic units for performing the functions described in this application, or a combination thereof.

For software implementation, the technologies described in some embodiments of this disclosure may be implemented by modules (such as processes and functions) that perform the functions described in some embodiments of this disclosure. Software code may be stored in the memory and executed by the processor. The memory may be implemented in or outside the processor.

Therefore, the objectives of this disclosure can also be implemented by running a program or a set of programs on any computing apparatus. The computing apparatus may be a general apparatus of common sense. Therefore, the objective of this disclosure may also be achieved by merely providing a program product including program code for implementing the method or apparatus. Therefore, such program product also constitutes this disclosure, and a storage medium storing such program product also constitutes this disclosure. Apparently, the storage medium may be any storage medium of common sense or any storage medium that will be developed in the future. It should also be noted that in the apparatus and method of this disclosure, apparently, the components or steps may be decomposed and/or recombined. Such decomposition and/or recombination should be considered as equivalent solutions of this disclosure. In addition, steps for performing the foregoing series of processing may be naturally performed in time sequence following the order of description, but are not necessarily performed in time sequence. Some steps may be performed in parallel or separate from each other.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. In most cases, the former is a more preferred implementation. Based on such an understanding, the technical solutions of this disclosure essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. An information transmission method, comprising:
    transmitting an uplink cancellation indication, wherein
    the uplink cancellation indication comprises time domain indication information and frequency domain indication information, a bit quantity of the frequency domain indication information is determined based on a payload size of the uplink cancellation indication and a bit quantity of the time domain indication information;
    wherein the bit quantity of the time domain indication information is determined based on first resource information, wherein
    the first resource information comprises at least one of an indicated resource area size of the time domain indication information and first configuration information.

2. The method according to claim 1, wherein the bit quantity of the time domain indication information is determined based on the first resource information and a second parameter, wherein
    the second parameter comprises at least one of the following: a first bit quantity, a first indication format, and a first indication granularity; and the first bit quantity is a preset bit quantity of the time domain indication information, the first indication format is a preset format of the time domain indication information, and the first indication granularity is a preset indication granularity of the time domain indication information.

3. The method according to claim 2, wherein the time domain indication information in the first indication format comprises one of the following:
    a start position indication vector;
    a start and length indication vector; and
    a bitmap.

4. The method according to claim 2, wherein in a case that a first information compression condition is met, the bit quantity of the time domain indication information is a second bit quantity determined based on the first resource information and a second indication granularity, wherein
    the second indication granularity is greater than the first indication granularity.

5. The method according to claim 4, wherein the first information compression condition comprises that a third bit quantity is greater than the first bit quantity, wherein the third bit quantity is a bit quantity determined based on the first resource information and the first indication granularity.

6. The method according to claim 2, wherein in a case that a second information compression condition is met, the bit quantity of the time domain indication information is a fourth bit quantity determined based on the first resource information and a second indication format, wherein
    the fourth bit quantity is smaller than a fifth bit quantity, and the fifth bit quantity is a bit quantity determined based on the first resource information and the first indication format.

7. The method according to claim 6, the second information compression condition includes that the fifth bit quantity is greater than the first bit quantity.

8. An electronic device, comprising a processor, a memory, and a computer program stored in the memory and capable of running on the processor, wherein when the computer program is executed by the processor, cause the electronic device to perform:
    transmitting an uplink cancellation indication, wherein
    the uplink cancellation indication comprises time domain indication information and frequency domain indication information, a bit quantity of the frequency domain indication information is determined based on a payload size of the uplink cancellation indication and a bit quantity of the time domain indication information;
    wherein the bit quantity of the time domain indication information is determined based on first resource information, wherein
    the first resource information comprises at least one of an indicated resource area size of the time domain indication information and first configuration information.

9. The electronic device according to claim 8, wherein the bit quantity of the time domain indication information is determined based on the first resource information and a second parameter, wherein
    the second parameter comprises at least one of the following: a first bit quantity, a first indication format, and a first indication granularity; and the first bit quantity is a preset bit quantity of the time domain indication information, the first indication format is a preset format of the time domain indication information, and the first indication granularity is a preset indication granularity of the time domain indication information.

10. The electronic device according to claim 9, wherein the time domain indication information in the first indication format comprises one of the following:
    a start position indication vector;
    a start and length indication vector; and
    a bitmap.

11. The electronic device according to claim 9, wherein in a case that a first information compression condition is met, the bit quantity of the time domain indication information is a second bit quantity determined based on the first resource information and a second indication granularity, wherein the second indication granularity is greater than the first indication granularity.

12. The electronic device according to claim 11, wherein the first information compression condition comprises that a third bit quantity is greater than the first bit quantity, wherein the third bit quantity is a bit quantity determined based on the first resource information and the first indication granularity.

13. The electronic device according to claim 9, wherein in a case that a second information compression condition is met, the bit quantity of the time domain indication information is a fourth bit quantity determined based on the first resource information and a second indication format, wherein
the fourth bit quantity is smaller than a fifth bit quantity, and the fifth bit quantity is a bit quantity determined based on the first resource information and the first indication format.

14. The electronic device according to claim 13, the second information compression condition includes that the fifth bit quantity is greater than the first bit quantity.

15. A non-transitory computer-readable storage medium, wherein the computer-readable storage medium stores a computer program, and when the computer program is executed by a processor, cause an electronic device to perform:
transmitting an uplink cancellation indication, wherein the uplink cancellation indication comprises time domain indication information and frequency domain indication information, a bit quantity of the frequency domain indication information is determined based on a payload size of the uplink cancellation indication and a bit quantity of the time domain indication information;
wherein the bit quantity of the time domain indication information is determined based on first resource information, wherein
the first resource information comprises at least one of an indicated resource area size of the time domain indication information and first configuration information.

16. The non-transitory computer-readable storage medium according to claim 15, wherein the bit quantity of the time domain indication information is determined based on the first resource information and a second parameter, wherein
the second parameter comprises at least one of the following: a first bit quantity, a first indication format, and a first indication granularity; and the first bit quantity is a preset bit quantity of the time domain indication information, the first indication format is a preset format of the time domain indication information, and the first indication granularity is a preset indication granularity of the time domain indication information.

17. The non-transitory computer-readable storage medium according to claim 16, wherein the time domain indication information in the first indication format comprises one of the following:
a start position indication vector;
a start and length indication vector; and
a bitmap.

18. The non-transitory computer-readable storage medium according to claim 16, wherein in a case that a first information compression condition is met, the bit quantity of the time domain indication information is a second bit quantity determined based on the first resource information and a second indication granularity, wherein
the second indication granularity is greater than the first indication granularity.

19. The non-transitory computer-readable storage medium according to claim 18, wherein the first information compression condition comprises that a third bit quantity is greater than the first bit quantity, wherein the third bit quantity is a bit quantity determined based on the first resource information and the first indication granularity.

20. The non-transitory computer-readable storage medium according to claim 16, wherein in a case that a second information compression condition is met, the bit quantity of the time domain indication information is a fourth bit quantity determined based on the first resource information and a second indication format, wherein
the fourth bit quantity is smaller than a fifth bit quantity, and the fifth bit quantity is a bit quantity determined based on the first resource information and the first indication format.

\* \* \* \* \*